(12) United States Patent
Krenkel et al.

(10) Patent No.: US 6,358,565 B1
(45) Date of Patent: *Mar. 19, 2002

(54) METHOD FOR MAKING A PROTECTIVE COATING CONTAINING SILICON CARBIDE

(75) Inventors: Walter Krenkel, Renningen; Thilo Henke, Stuttgart, both of (DE)

(73) Assignee: Deutsches Zentrum fuer Luft-und Raumfahrt E.V., Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,681

(22) Filed: Jul. 16, 1999

(30) Foreign Application Priority Data

Jul. 28, 1998 (DE) .......................... 198 34 018

(51) Int. Cl.⁷ .................................. B05D 3/02
(52) U.S. Cl. .................. 427/343; 427/202; 427/228; 427/294; 427/337; 427/374.4; 427/376.2; 427/397.7; 427/402
(58) Field of Search ................ 427/228, 226, 427/202, 294, 333, 402, 397.7, 374.1, 337, 343, 344, 374.4, 376.2

(56) References Cited

U.S. PATENT DOCUMENTS 5,205,970 A * 4/1993 Brun et al. ................ 264/60
5,318,799 A * 6/1994 Schulten et al. ............ 427/226
5,518,816 A * 5/1996 Shuford .................... 427/419.7
6,042,935 A * 3/2000 Krenkel et al. ............. 427/228

FOREIGN PATENT DOCUMENTS

DE 4203773 8/1993
DE 29610498 10/1996

* cited by examiner

*Primary Examiner*—Timothy Meeks
*Assistant Examiner*—Kirsten A. Crockford
(74) *Attorney, Agent, or Firm*—Milde, Hoffberg & Macklin, LLP

(57) ABSTRACT

The present invention relates to a method for making a protective coating containing silicon carbide on at least a portion of the surface of a substrate made from a material with a softening temperature that is above the temperature applied to make the protective coating, where silicon is deposited on the portion of the surface of the substrate and where, under vacuum or in an inert atmosphere, the substrate is heated to a temperature above the melting point of silicon, and the silicon is brought to reaction with carbon that is contained in a porous coating. The surface of the object to be coated is initially provided with a porous carbon coating with an open porosity in a range between 40 and 95%, where said porous carbon coating is covered with a uniform coating of silicon, where the ratio in percent of mass (Ma-%) of the applied silicon to that of the carbon in the porous carbon coating is greater than 2.34, where the substrate is heated to a temperature that is above the melting temperature of the silicon, and that the substrate, provided with the coating that contains silicon carbide and free silicon, is cooled down to room temperature.

20 Claims, 3 Drawing Sheets

METHOD FOR MAKING A PROTECTIVE COATING CONTAINING SILICON CARBIDE

BACKGROUND OF THE INVENTION

The present invention relates to a method for making a protective coating containing silicon carbide, particularly a wear/tear, corrosion or abrasion protective coating on at least a portion of the surface of a substrate made from a material with a softening temperature that is above the melting temperature of silicon, where silicon is deposited on the portion of the surface of the substrate that is to be provided with a protective coating and where, under vacuum or in an inert atmosphere, the substrate is heated to a temperature above the melting point of silicon, brought to reaction with carbon that is contained in a porous coating, and, thereafter cooled down.

Such a method is known from the German Patent No. DE-A1 42 03 773, which corresponds to U.S. Pat. No. 5,318,799. According to the method known from this, to heat-treat the surface of an object, the surface to be coated is initially covered with a coat of at least one meltable material and a binding agent, and prepared in such a manner, then is exposed to a heat treatment at a temperature above 600° C. This heat treatment occurs under vacuum or in an inert atmosphere. During this process, the coat is transformed to an at least partially porous top coating with an outer crust. The temperature is then increased such that the softening temperature of the object is not violated, however the meltable effective material is heated above its melting point. This increased temperature is then maintained until the melted effective material is at least partially vaporized and in the process by diffusion has created a surface zone that forms a dense coating in the surface material of the object together with this surface material. Thereafter, the top coating is cooled down and removed from the object. With such a method, Sic coatings can be formed as protective coatings, where then Si powder and dust are applied to the object as a binding agent, a first heat treatment is performed at 700° C.–800° C. to carbonize the coat; thereafter, a heat treatment is carried out in a range of 1400° C. to 1700° C. for 1–2 hours to silicate the carbon structures. This creates an object with a Sic coating.

In addition, a vehicle's brake disk, or clutch disk respectively, is known from the German Utility Model No. DE-U1 296 10 498, where said disk is constructed of a C—C/SiC material, where the disk features an Sic coating. This Sic coating is formed by dip coating or made through vacuum impregnation.

Thin protective coatings made of SiC that are used according to the above-mentioned current state-of-the-art are brittle even at room temperature. Due to this brittleness, cracking and chipping occur such that the desired effect of this coating as a protective coating is lost. This brittleness can be observed especially when the object covered with such a SiC coating is exposed to fluctuating temperature cycles.

SUMMARY OF THE INVENTION

Based on this state-of-the-art, it is the objective of the present invention to cover an object with a protective coating that features the advantages of an SiC coating, which however, does not have the brittleness that is present with coatings according to the current state-of-the-art.

With the type of method referred to at the beginning, this in order to achieve a homogeneous protective coating of silicon carbide and free silicon, the surface of the object to be coated is initially provided with a porous carbon coating with a porosity in a range between 40 and 95%, and the porous carbon coating is covered with coating of silicon, where the ratio of the mass of the applied silicon to that of the carbon in the porous carbon coating is greater than 2.34. The substrate is heated to a temperature that is above the melting temperature of the silicon, to a maximum temperature of 1650° C. to avoid a boiling condition of the silicon. The substrate, provided with the coating that contains silicon carbide and free silicon, is cooled down to room temperature.

To form the coating subject to the invention, it is initially important to provide a porous carbon coating on the substrate to be coated. This porous carbon coating provides on the one hand the portion of carbon that will be brought to reaction with the silicon to form the subsequent protective coating containing the silicon carbide coating, and on the other hand, the rate of free silicon, that is important for the properties of the finished protective coating, can be set by selecting a porosity where a silicon surplus remains. Free silicon can then, on the one hand, be stored in the pores, and on the other hand, the rate of silicon can be set such that a thin coating that consists primarily of silicon remains on the surface of the finished protective coating. In any case, attention has to be paid to the fact that the applied silicon in relation to the carbon in the porous carbon coating, concerning the ratio of silicon to carbon in percent of mass is greater than 2.34. The structure of such a protective coating does not require organic binding agents that would otherwise compromise the purity or quality of the silicon through splitting off of decomposition products during the heating phase or through outgasing.

It has been found, that practically no wear occurs when using such a surface protective coating that contains a portion of free silicon, when such an object coated with such a surface coating is brought into abrasive contact with an organic layer, for example, with organic abrasive coatings of an abrasion unit. In addition, such a coating distinguishes itself through a very high thermal shock resistance, that is, $R_1 \geq 500$ K, where $R_1$ is defined as the ratio of the tensile stress ($\sigma$) to $E^*\alpha$, where E is the modulus of elasticity and $\alpha$ the coefficient of thermal expansion of the protective coating.

To name a few preferred areas of applications, protective coatings that are formed according to the method subject to the invention are of particular advantage as wear/tear protective coatings on abrasion units such as brake disks, corrosion protective coatings on pipe-shaped heat exchanger elements or abrasion protective coatings on sliding ring packings.

It is apparent that such protective coatings do not require that the object to be coated exhibits a certain porosity, because the protective coating is applied to the object to be coated by using a porous carbon object or a porous carbon coating respectively. To enhance bonding between the substrate and the protective coating, it may be advantageous to adjust the roughness of the surface of the substrate to be coated, for example to a mean roughness of Ra=2. Precisely such a roughness value offers the advantage of a uniform and strong bond between the protective coating and the substrate.

Practically any substrate that has a temperature resistance to temperatures above the melting point of silicon can be coated with this coating. This includes ceramic substrates, substrates made of carbon, substrates made of silicon carbide, ceramic composite materials such as C/C, C/C—

SiC, SiC/SiC, or metals such as tungsten, to name just the most important ones.

Suitable for the structures of the porous carbon coating are carbon felt, carbon mats, carbon weaves, carbon foils and/or carbon fleece that are placed on the substrate according to the desired thickness of the protective coating. The porosity can be specified by selecting a suitable type of the aforementioned carbon materials. The carbon coating made of carbon felt or mats is preferable, because these materials have the advantage of a rapid and complete reaction between C and SiC, particularly when the individual fibers are very thin or in an amorphous condition. Alternatively, the porous carbon coating can be created through pyrolysis of paper, wood, wood pulp and/or cardboard placed on the substrate, where the pyrolysis of these materials occurs in the furnace during the heating stage prior to melting the creating the reaction with the carbon to form silicon carbide.

The required silicon can be provided by applying particle-shaped silicon, where the particle size is to be between 0 and 15 mm. The coating thickness to be created is a particular criterion for selecting the particle size. The silicon can also be placed on the prepared porous carbon object in the shape of a plate made of silicon. Such a plate material has the advantage that uniform coverage of the C-coating is possible for flat objects.

The silicon to be used should have a purity of 99.9% to prevent the protective coating from being contaminated, or to ensure that the protective coating to be created basically contains only silicon carbide and free silicon.

It has been found that in order to achieve the advantages of the protective coating subject to the invention as described above, the ratio of percent mass (Ma-%) of applied silicon to carbon should be in a range of 2.35 to 49. A high set value for the portion of free silicon in the protective coating is preferred, that is, the free silicon should be 50% to 90% in relation to the total mass, preferably 70% to 90%, where in the latter range a value of 90% is preferred. The result of such a high content of free silicon is that the protective coating is less brittle, and thus has no tendency to chip (under thermal and/or mechanical load) after cooling down to room temperature.

The substrate is preferably made of carbon, a composite of carbon/fiber-enforced carbon, C—SiC, C/C—SiC, or of SiC—SiC to achieve a homogenous structure with high strength, where this object features the advantages of the applied protective coating listed above. With reference to the applied coating, the substrate consists of a material of the same type, that is, it consists of carbon and silicon carbide.

A C—SiC object is made of C fibers with a relatively porous SiC matrix using, for example, the CVI method or the LPI method (CVI=Chemical Vapor Infiltration, LPI= Liquid Polymer Infiltration).

A C/C—SiC object is made of C fibers with a C+SiC matrix, for example, which does not require subsequent condensing, according to the LSI method.

A SiC—SiC object is made of SiC fibers with a SiC matrix according to the CVI method, an always porous object with a surface that should, therefore, possibly be condensed prior to applying the protective coating.

A protective coating with a thickness of 0.2 to 2 mm is sufficient for achieving the desired advantages. When a protective coating is selected which is too thin, the protective effect will be lost due to unavoidable abrasion, etc. during use. The effect of values above 2 mm is that the tendency for chipping increases due to tension cracking. In general, the tendency for chipping is proportional to the coating thickness.

Heating rates that are basically uniform should be observed during heat treatment to build a homogenous coating, that is, to achieve, or ensure, a complete reaction of the available carbon with the silicon to form silicon carbide. Initially, the substrate with the applied prepared carbon coating and the silicon coating applied on top should be heated to a temperature of about 1420° C. The temperature should then be raised to between 1420 and 1650° C. After that, the temperature should be kept at that level for a period of 1 to 60 minutes. Basically, the holding time depends on the temperature and the thickness. For thin coatings (0.2 mm), a short holding time (1 min) is sufficient; for thick coatings (2 mm) a holding time of up to 60 min is required. A prerequisite is sufficient porosity that allows the silicon to react with the entire carbon during this holding time. Thereafter, the object provided with the protective coating should be cooled to room temperature at a uniform cooling rate. It has been found that surface cracks or tension cracks can occur during this cool down period. These cracks are undesired and are the result of the decrease in tension between the coating and the substrate material due to an α maladjustment. These tension cracks can be kept to a minimum when the thermal expansion of coating and substrate material is of a similar magnitude.

Heating of the substrate to a temperature of 1420° C. should occur at a heating rate in a range of 40 to 400 K/h, preferably of 40 to 200 K/h, and particularly of 80 K/h, which is a compromise between process duration and uniform heating of the components and the coating to be created. The cool down rate should then, after the silicon has been brought to reaction with the carbon, be in a range of 20 to 200 K/h, preferably at about 70 K/h. A cool down rate of 70 K/h will ensure that cracks can occur successively in the coating. The internal pressure in the furnace, where the heat treatment is being performed, should be kept at about $10^{-3}$–$10^{-6}$ bar. This internal pressure ensures that the melting point of silicon, that of about 1420° C. is reached, so that oxidation is prevented and that a rapid conversion of silicon and carbon to silicon carbide occurs.

For a full understanding of the present invention, reference should now be made to the following detailed description of the preferred embodiments of the invention as illustrated in the accompanying drawings.

DESCRIPTION OF THE PREFERRED EMBODIMENTS

Figure 1A:
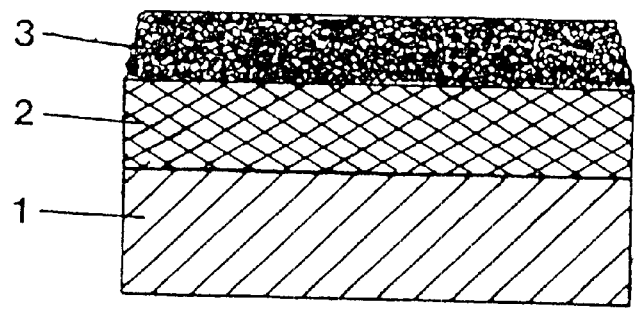
FIGS. 1A to 1C show schematically the process steps to create a protective coating on a substrate according to the method subject to the invention.

The present invention will now be described with reference to FIGS. 1–4 of the drawings. Identical elements in the various figures are identified by the same reference numerals.

To provide the surface of an object with a protective coating of the type subject to the invention, a substrate 1, for example a fiber-enforced ceramic disk (C/C—SiC substrate disk) is initially ground flat using a diamond disk with a grain of 150. To build up a 2 mm thick coating as protective coating, the substrate 1 is then covered with a 2 mm thick carbon fleece 2, consisting of 15 individual layers with a thickness of 0.13 mm and an area weight of 30 g/m$^2$. This carbon fleece 2 has a mass of 19.6 g relative to the area to be coated, e.g., an abrasion surface and is uniformly covered with 12.5 times the weight in silicon 3, that is, with a total of 245 g of silicon (purity 99.9% and grain size 0–15 mm), as shown in FIG. 1A.

Figure 1B:
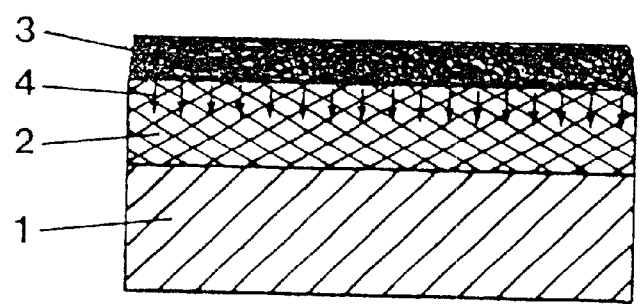
Figure 1C:
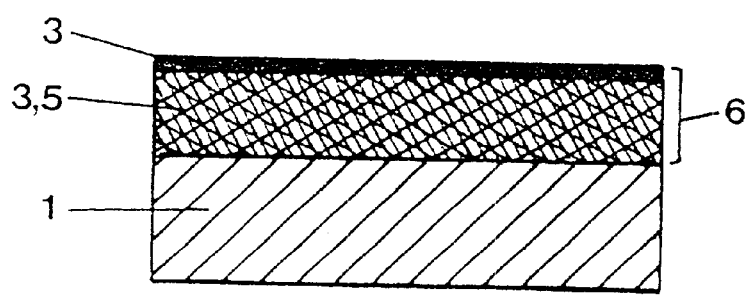

Next, heating occurs in a vacuum furnace at an internal pressure of 10$^{-6}$ bar with a heating rate of 40 K/h, initially to a temperature of 1650° C. (FIG. 1B). The silicon 3 begins to melt at 1420° C. and infiltrates the carbon fleece as is indicated by the arrows 4 in FIG. 1B. The reaction with the carbon occurs at a temperature between 1420° C. and 1650° C. such that silicon carbide 5 is formed. Due to the amount of silicon 3 that has been applied to the carbon fleece coating, silicon has been provided in a stoichiometric surplus in relation to the carbon, with residue of free silicon remains after the heat treatment, as indicated in FIG. 1C, both of which are embedded in the silicon carbide 5 and as an outer coating . Based on the initial amounts of carbon and silicon described above, silicon carbide (Sic) is present with about 20% mass portion in relation to the protective coating 5 consisting of Si and SiC while free silicon is present in an amount of 80% in relation to the total mass Si and Sic. The distribution of the free silicon 3 that infiltrates the silicon carbide 5 can be adjusted through the type of carbon fleece used, that is, through its porosity.

After the end of the heat treatment at 1650° C., the object is cooled down, preferably at a cool down rate of 70 K/h with the unit remaining in the furnace at the aforementioned internal pressure of the furnace. During the cool down phase, small tension cracks may occur. Such tension cracks are tolerable.

Figure 2:
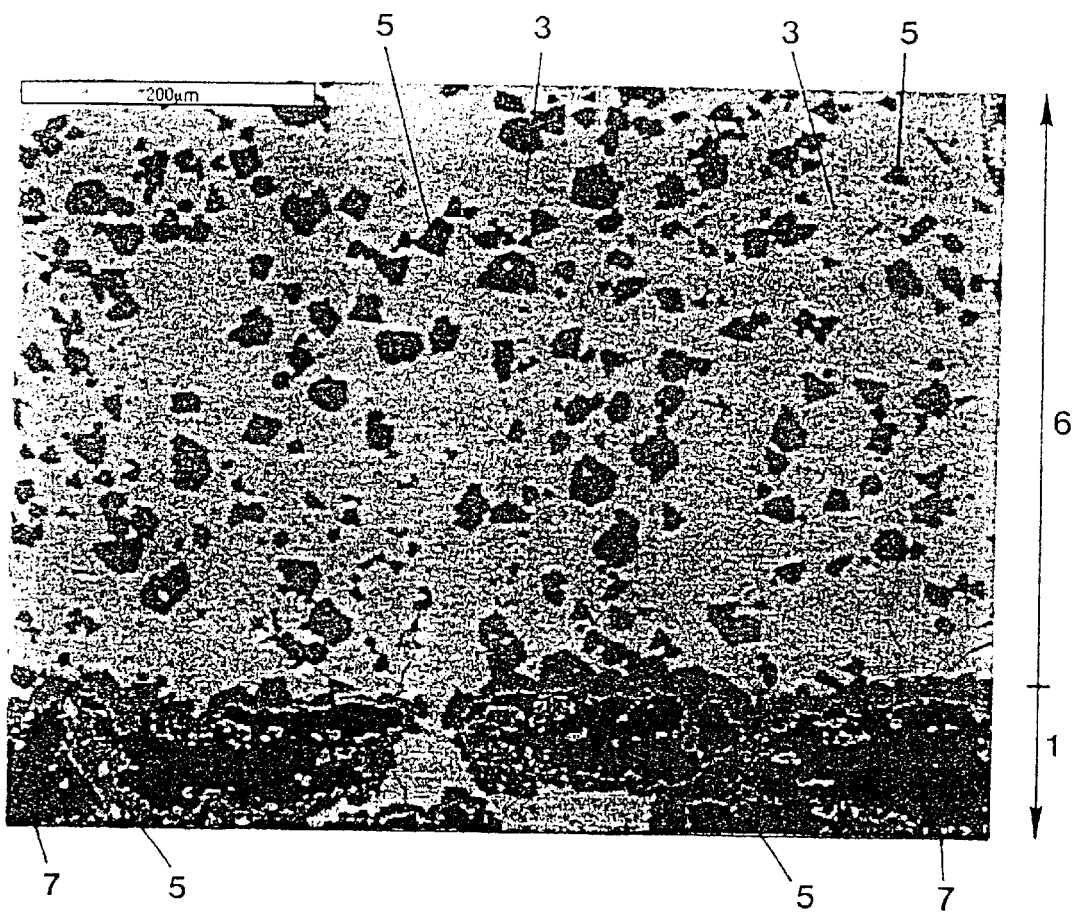
FIG. 2 shows an electron microscope image of the protective coating with a 200× magnification.

The finished substrate 1, coated with the protective coating 6, has a structure in the transition phase between substrate 1 and protective coating 6 when viewed with an electron microscope as shown in FIG. 2. The light gray areas represent free silicon 3, the dark gray areas 6 represent Sic and the black areas 7 represent carbon in the substrate 1 (fibers and matrix). The portion of free silicon 3 in the protective coating 6 which is about 80%, is in relation to the mass of this protective coating 6. Because FIG. 2 only shows a small section of the transition phase between substrate 1 and protective coating 6, a part of the protective coating potentially remaining on the outside and containing the free silicon, as shown schematically in FIG. 3C, cannot be seen.

The advantage of the protective coating 6 as described above, can be seen in its good bonding properties, even on orthotropic substrates. It has a very high hardness, with nevertheless a remaining elasticity. It can be manufactured at a reasonable expense, it is dense and forms a non-porous coating due to the anomaly of silicon.

The portion of free Si in the protective coating 6 provides a strong bond with the substrate to be coated. In addition, the toughness and elasticity of the protective coating 6 can be adjusted using the amount of free Si, with both toughness and elasticity being improved by the portion of free Si compared to a pure SiC coating. Coating 6 is dense, that is, it hardly has pores due to the fact that silicon exhibits an increase in volume when congealing, so that shrinkage pores do not occur, but only tension cracks occur during the continued cool down to room temperature when the heat expansion of the coating 6 and of the substrate material 1 is different. The increase in fracture toughness of the coating can be explained in that silicon has a Mohs hardness of 7 while the hardness of SiC is between 9.5 and 9.75. This is also the reason for the low brittleness of the coating. In addition, silicon has a higher temperature fluctuation resistance due to its lower heat expansion coefficient of 2.6*10$^{-6}$ K$^{-1}$ in comparison to silicon carbide (with a heat expansion coefficient of 4.7*10$^{-6}$ K$^{-1}$), which increases the overall temperature fluctuation resistance of the protective coating as well. This, in turn, increases the bonding properties of an abrasion coating of a brake disk.

Figure 3:
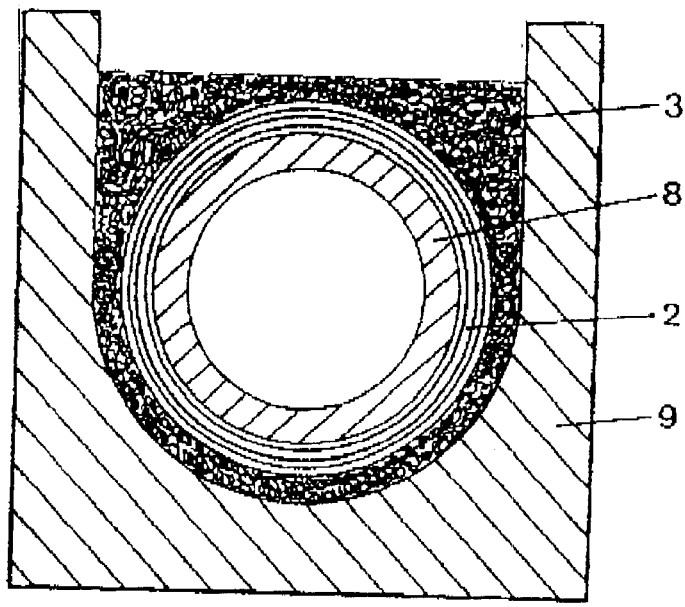
FIG. 3 shows the cross-section of an arrangement for applying the protective coating on the outside of a pipe.

Another example for an advantageous application of the method subject to the invention is the sheathing of a pipe-shaped substrate 8 with such a protective coating. To this end, as shown in FIG. 3, for example, a C/C—SiC pipe 8 that is to be provided with a protective coating on the outside is wrapped with seven layers of carbon fleece 2 (area weight 30 g/m$^2$). A graphite trough is provided that corresponds to the final contours of the pipe. Thereafter, pipe 8, that is to be coated is surrounded on all sides with Si granules, is then placed into this trough, or a graphite crucible 9, and then heat-treated as described above using FIGS. 1A to 1B. During the heat treatment at 1650° C. for up to 1 hour, the Si granules 3 are brought to reaction with the carbon of the carbon fleece 2, such that a structure is created like the one presented in FIG. 1C. This is followed by a cool down to room temperature. In this manner, such pipes 8 can be covered with an outer protective coating.

Figure 4:
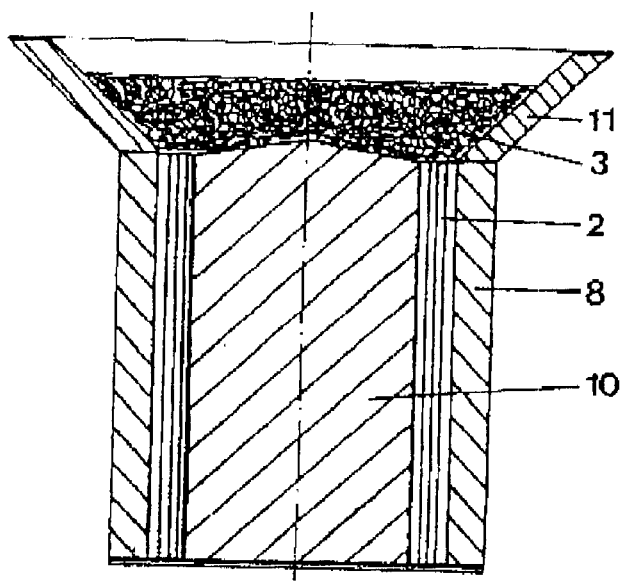
FIG. 4 shows the cross-section of an arrangement for applying the protective coating on the inside of a pipe.

The following method can be used if, for example, a pipe-shaped object shall be coated on the inside. For example, a pipe 8 made of C/C—SiC is provided and lined with seven layers of carbon fleece (area weight 30 g/m$^2$), as can be seen in FIG. 4. A graphite core 10 is then inserted into this inner space. For silicating, pipe 10 is placed upright into a vacuum furnace and provided with a funnel-like device serving as a storage container for the silicon 3. Heat treatment is carried out in the same manner as the coating of the outside of the pipe. The molten silicon flows into the porous carbon object and reacts with the carbon to form SiC. The portion of free silicon is adjusted by the surplus of silicon placed in funnel 11.

From the above mentioned examples, it is apparent that complicated structures that are to be covered with a protective coating of a specified thickness containing silicon carbide can be made in this manner as well.

There has thus been shown and described a novel method for making a protective coating containing silicon carbide which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Method for providing a protective coating on a substrate, said method comprising:

providing a substrate made of a material having a softening temperature which is above the melting temperature of silicon, said substrate having a surface;

covering said surface with a porous carbon coating consisting essentially of carbon, wherein said coating has an open porosity in a range between 40 and 95%;

applying a further coating layer consisting essentially of silicon directly on said porous carbon coating and over the substrate, wherein the ratio of the mass of the applied silicon to the mass of the carbon is selected from within a range of 2.35 to 49;

heating said substrate to a temperature above the melting point of silicon but below the boiling point of silicon, said heating being done under vacuum or in an inert atmosphere to thereby cause the silicon to melt and infiltrate the porous carbon coating and to bring said silicon to reaction with the carbon; and cooling said substrate down to room temperature, wherein said substrate is thereby coated with a homogeneous protective layer consisting only of silicon carbide and free silicon with a thickness of the finished protective coating layer in the range of 0.2 mm to 2 mm.

2. Method according to claim 1, wherein the porous carbon coating is created by placing carbon felt, mats, weaves, foils plates and/or carbon fleece on the substrate.

3. Method according to claim 1, wherein the porous carbon coating is created through pyrolysis of paper, cardboard, wood and/or wood pulp placed on the substrate.

4. Method according to claim 1, wherein a silicon plate is placed on the porous carbon coating for reaction with the carbon.

5. Method according to claim 1, wherein particle-like silicon is deposited on the porous carbon coating for reaction with the carbon.

6. Method according to claim 5, wherein particle-like silicon with a particle size of up to 15 mm is deposited on the porous carbon coating.

7. Method according to claim 1, wherein the silicon deposited on the porous carbon coating has a purity of 99.9%.

8. Method according to claim 1, wherein the protective coating is applied to a substrate made of a material selected from the group consisting of carbon, a composite of carbon fiber reinforced carbon, C—SiC, C/C—SiC and SiC—SiC.

9. Method according to claim 8, wherein the substrate that is used is structured as an abrasive unit.

10. Method according to claim 8, wherein the substrate is a pipe-shaped component of a heat exchanger.

11. Method according to claim 8, wherein the substrate is a sliding ring seal.

12. Method according to claim 1, wherein the entire outer surface of the substrate is provided with the protective coating.

13. Method according to claim 1, wherein the entire surface of the substrate is provided with the protective coating.

14. Method according to claim 1, wherein the substrate, provided with the porous carbon coating and the silicon coating applied on top, is heated at a substantially uniform heating rate to a temperature of between 1420 and 1650° C., is kept at that temperature for a period in the range of 1 to 60 minutes and is then cooled down to room temperature with a substantially uniform cooling rate.

15. Method according to claim 14, wherein the substrate is heated with a heating rate in a range of 40 to 400 K/h.

16. Method according to claim 15, wherein the substrate is heated with a heating rate in a range of 40 to 200 K/h.

17. Method according to claim 15, wherein the substrate is heated with a heating rate of 80 K/h.

18. Method according to claim 14, wherein the heated substrate is cooled down with a cooling rate in a range of 20 to 200 K/h.

19. Method according to claim 18, wherein the heated substrate is cooled down with a cooling rate of approximately 70 K/h.

20. Method according to claim 1, wherein a pressure of about $10^{-3}$–$10^{-5}$ bar is maintained during the heating and cooling phase.

\* \* \* \* \*